(12) United States Patent
Imoto

(10) Patent No.: US 6,587,285 B2
(45) Date of Patent: Jul. 1, 2003

(54) VEHICLE PERIPHERY VISUAL CONFIRMATION APPARATUS

(75) Inventor: Masayoshi Imoto, Nagoya (JP)

(73) Assignees: Autonetworks Technologies, Ltd., Nagoya (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 51 days.

(21) Appl. No.: 09/905,944

(22) Filed: Jul. 17, 2001

(65) Prior Publication Data

US 2002/0014956 A1 Feb. 7, 2002

(30) Foreign Application Priority Data

Jul. 31, 2000 (JP) ........................................ 2000-231289

(51) Int. Cl.[7] ................................................ G02B 5/04
(52) U.S. Cl. ........................ 359/831; 359/833; 359/834
(58) Field of Search .................................. 359/831, 833, 359/834, 835, 836, 837, 843, 844; 348/148, 149, 49, 36, 335; 340/435, 436

(56) References Cited

U.S. PATENT DOCUMENTS 6,166,764 A * 12/2000 Sakata ........................ 348/148
6,472,995 B2 * 10/2002 Imoto ...................... 340/815.4

* cited by examiner

*Primary Examiner*—Mohammad Sikder
(74) *Attorney, Agent, or Firm*—Oliff & Berridge, PLC

(57) ABSTRACT

In a vehicle periphery visual confirmation apparatus, between the vertical angle portion 5 of a prism 4 and the front end portion 28 of a case 3A is interposed a light shield portion 3a which shields light rays crossing substantially in the right and left direction in front of the prism 4. Even in case where light rays coming from the outside enter in front of the vertical angle portion 5 of the prism 4 and are going to cross in front of the prism 4, the light rays can be prevented by the light shield portion 3a. This can prevent the overlapped reflection of a vision image resulting from the fact that the light rays crossing in front of the prism are reflected by the internal surfaces of the penetration window portions and enter the interior portion of the prism.

3 Claims, 5 Drawing Sheets

VEHICLE PERIPHERY VISUAL CONFIRMATION APPARATUS

BACKGROUND OF THE INVENTION

1. Field of the Invention

The present invention relates to a vehicle periphery visual confirmation apparatus which, under a poor visibility condition, takes a picture of a peripheral scene before or behind a vehicle, or, a picture of the right-side or left-side scene oft he vehicle, that is, the scene of a blind spot to a driver, and displays the picture of such vehicle peripheral scene to the driver.

2. Description of the Related Art

FIG. 5 shows the structure of a conventional vehicle periphery visual confirmation apparatus. This vehicle periphery visual confirmation apparatus 1 comprises a picture camera apparatus 11 disposed on the outside portion of a vehicle to take pictures of two vehicle peripheral scenes existing in the mutually opposite directions, a mirror image reversal processing part 12 for mirror-image processing picture signals supplied from the picture camera apparatus 11, and a display part 15 disposed within a vehicle room for displaying the picture images obtained from the mirror image reversal processing part 12.

The picture camera apparatus 11 comprises: a lightproof case 3 on the two sides of which there are formed a pair of left and right penetration window portions 2L, 2R each made of transparent glass; a prism 4 having an isosceles-triangular-shaped section stored in the interior portion of the case 3 and disposed in such an attitude that its vertical angle portion 5 faces the front portion of the case 3 (in FIG. 5, the upper portion of the case 3) and its prism side surfaces 8L, 8R respectively face the left and right penetration window portions 2L, 2R; and, an imaging device 10 stored and disposed in the rear of the prism 4 for converting light rays 18L, 18R into image signals. Here, referring specifically to the light rays 18L, 18R, they enter the prism side surfaces 8L, 8R, their respective light paths are changed within the prism 4, and then they are guided through a given imaging lens 9 onto the imaging surface of the imaging device 10. In this structure, the imaging lens 9 is disposed in the rear of the prism 4 (in FIG. 5, in the lower portion) in such a manner that the optical axis 25 of the imaging lens 9 is coincident with the bisector of the vertical angle portion of the isosceles-triangular-shaped section of the prism 4.

The thus structured picture camera apparatus 11 is mounted on the front bumper or front grille of the vehicle in such a manner that, for example, the front portion of the picture camera apparatus 11 (the front portion of the case 3) faces forwardly of the vehicle and the penetration window portions 2R. 2L respectively face on the right and left sides of the vehicle.

In this state, the light ray 18L corresponding to the scene of the left side of the vehicle, as shown in FIG. 5, penetrates through the penetration window portion 2L and prism side surface 8L, advances through the interior portion of the prism 4 and reaches the prism side surface 8R. And, the light ray 18L is then internally reflected by the prism side surface 8R, is radiated from the prism side surface 8R, is image formed by the imaging lens 9, and is guided to the left half surface 10L of the imaging surface of the imaging device 10.

In the case of the light ray 18R which corresponds to the right-side scene of the vehicle, as the light rays 18L and 18R are symmetric, the light ray 18R is similarly guided to the right half surface 10L of the imaging surface of the imaging device 10. And, both of the light rays 18L, 18R are converted into image signals by the imaging device 10.

The pictures of the left-side and right-side scenes are taken in this manner, the image signals of the pictures are mirror image reversal processed by the mirror image reversal processing part 12, and, as shown in FIG. 6, are supplied to the display part 15. In the display part 15, the left-side scene taken in from the penetration window portion 2L is displayed on the left half screen 15L of the display part 15 as a left-side scene image 19L, whereas the right-side scene taken in from the penetration window portion 2R is displayed on the right half screen 15R of the display part 15 as a right-side scene image 19R.

However, in the conventional vehicle periphery visual confirmation apparatus, there is a fear that part of the other picture can come out in one picture, that is, an image like a vision (which is hereinafter referred to as a vision image) can appear, thereby degrading the visibility of the picture. For example, as shown in FIG. 5, let us assume a case in which, at night, a vehicle with a headlight 20 on approaches our vehicle slightly from the right side. In this case, after the light of the headlight 20 penetrates through the right-side penetration window portion 2R, part of the light passes through the adjacent portion of the vertical angle portion of the prism 4 and reaches the left-side penetration window portion 2L. Here, about 96% of the light that has arrived at the left-side penetration window portion 2L penetrates through the left-side penetration window portion 2L, whereas the remaining light 21, namely, about 3% of the light is reflected by the internal surface of the left-side penetration window portion 2L. As a result of this, the light 21 is allowed to enter the left-side prism side surface 8L. The light 21, which has entered the left-side prism side surface 8L in this manner, advances through the interior portion of the prism 4, reaches the right-side prism side surface 8R, and is reflected by the internal surface of the right-side prism side surface 8R; and, after then, the light 21 is radiated from the prism rear surface 8B of the prism 4, is image formed by the imaging lens 9, and is guided to the left half surface 10L of the imaging surface of the imaging device 10.

In other words, in the present case, the partial light 21 of the light from the headlight 20, which ought to be situated on the right side, is image formed by the imaging lens 9 while it is overlapped with the light ray 18L entering from the left side, and is guided to the left half surface 10L of the imaging surface of the imaging device 10; and, the thus-formed image is displayed on the left half screen 15L of the display part 15 as the left-side scene image.

SUMMARY OF THE INVENTION

The present invention aims at eliminating the above drawbacks found in the conventional vehicle periphery visual confirmation apparatus. Accordingly, it is an object of the invention to provide a vehicle periphery visual confirmation apparatus capable of preventing occurrence of a vision image which is caused when light entering from the outside through one of right and left penetration window portions passes through the adjacent area of the vertical angle portion of the right and left prism side surfaces of a prism and is then reflected by the opposite-side penetration window portion.

In attaining the above object, according to a first aspect of the invention, there is provided a vehicle periphery visual confirmation apparatus comprising a picture camera apparatus disposed on the outside of a vehicle, the picture camera apparatus comprising: a case including a pair of right and left penetration window portions respectively formed on the two sides thereof; a prism having an isosceles-triangular-shaped section and disposed within the case in such an attitude that its vertical angle portion faces the front portion of the case and its right and left prism side surfaces corresponding to the two equal sides of its isosceles triangle shape respectively face the right and right penetration window portions; and, an imaging device which is disposed in the rear of the prism and also which, when light rays entering from one of the right and left prism side surfaces are reflected by the other of the right and left prism side surfaces and are radiated from the prism rear surface of the prism, focuses the light rays onto an imaging surface of the imaging device through a given imaging lens to thereby convert the light rays into image signals, wherein, between the vertical angle portion of the prism and the front end wall of the case, there is interposed light shielding means for shielding light rays crossing substantially in the right and left direction in front of the prism.

According to a second aspect of the invention, in a vehicle periphery visual confirmation apparatus as set forth in the first aspect of the invention, the light shielding means is formed integral with the front end wall of the case.

According to a third aspect of the invention, in a vehicle periphery visual confirmation apparatus as set forth in the first aspect of the invention, the light shielding means is formed integral with a prism fixing member for fixing the prism to the case.

DETAILED DESCRIPTION OF THE PREFERRED EMBODIMENTS

Embodiments of the invention will be described with reference to the accompanying drawings.
(First Embodiment)

Figure 1:
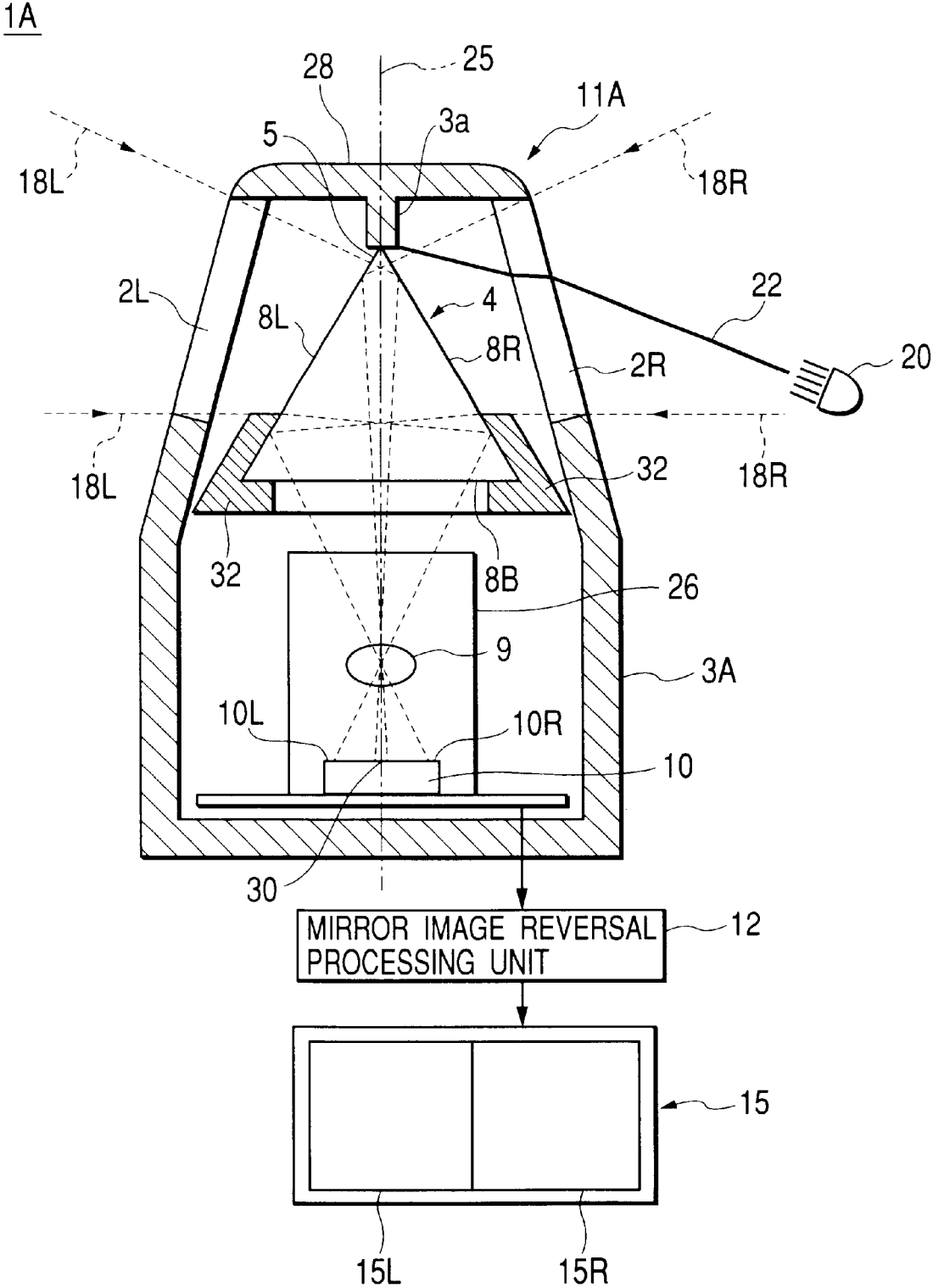
FIG. 1 is a schematic view of the structure of a vehicle periphery visual confirmation apparatus according to a first
Figure 2:
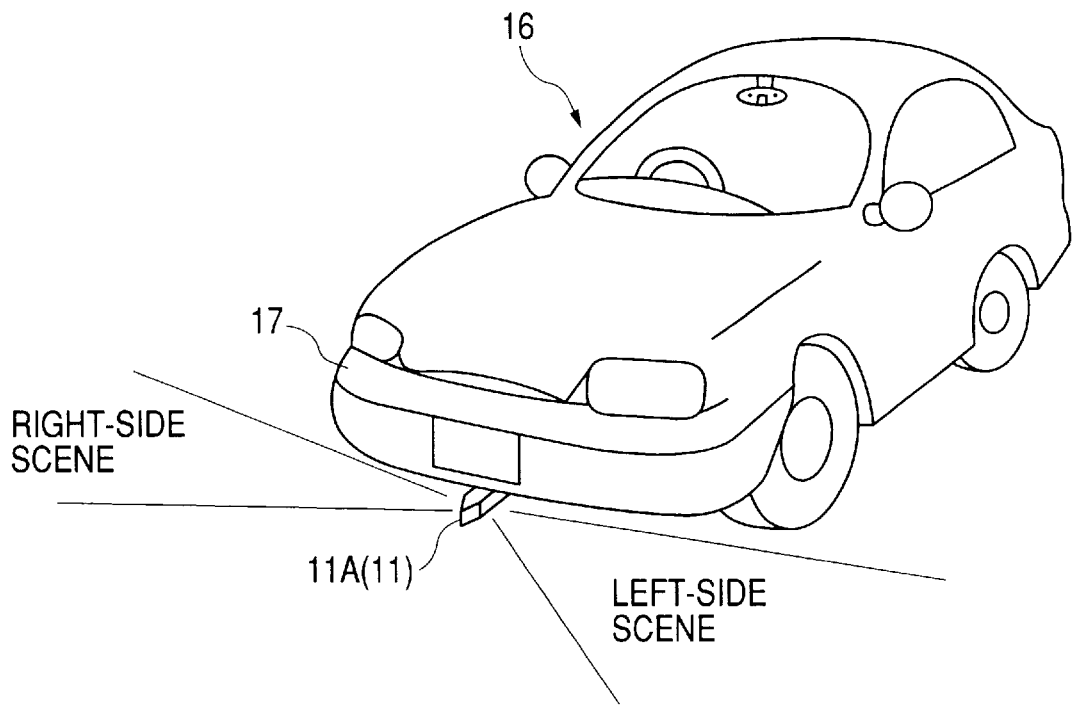
FIG. 2 is a view of a state of a vehicle on which there is disposed a picture camera apparatus forming part of the above vehicle periphery visual confirmation apparatus.

Now, a description will be given below of a first embodiment of a vehicle periphery visual confirmation apparatus according to the invention with reference to FIGS. 1 and 2. FIG. 1 is a schematic view of the structure of a vehicle periphery visual confirmation apparatus according to the first embodiment of the invention, and FIG. 2 is a view of a state of a vehicle on which there is disposed a picture camera apparatus forming part of the present vehicle periphery visual confirmation apparatus. By the way, in the present embodiment, parts thereof having similar functions to those employed in the above-mentioned conventional vehicle periphery visual confirmation apparatus are given the same designations.

The vehicle periphery visual confirmation apparatus 1A according to the present embodiment, as shown in FIGS. 1 and 2, comprises a picture camera apparatus 11A which is to be disposed, for example, downwardly of a front bumper 17 of a vehicle 16, a display part 15 composed of an LCD or a CRT which is disposed at a position easy for a driver to observe visually, for example, at a position of an instrumental panel disposed within a vehicle chamber so as to be able to display the image of the periphery of the vehicle taken by the picture camera apparatus 11A, and a mirror image reversal processing part 12 which mirror image reversal processes the signal of the image taken by the picture camera apparatus 11A and supplies the thus processed signal to the display part 15.

The picture camera apparatus 11A comprises: a lightproof case 3A; a pair of left and right penetration window portions 2L, 2R which are formed of light transmissive resin such as PMMA, are respectively positioned on the two side surfaces of the case 3A and are mounted in openings respectively formed in these side surfaces, an imaging device 10 such as a CCD camera disposed within the case 3A, an imaging lens 9, and a prism 4 which, while changing the light paths of light rays 18L, 18R entering from the penetration window portions 2L, 2R, guides the light rays 18L, 18R through the imaging lens 9 to the left half surface 10L of the imaging surface of the imaging device 10 or to the right half surface 10R thereof.

The prism 4 is made of, for example, a nitric material BK7 (index of refraction n: 1.517), and is formed in a prism shape having an isosceles-triangular-shaped section, while the angle of the vertical angle portion 5 thereof is, for example, 64 degrees. The prism 4 is disposed within the case 3A while it is fixed to and held by, for example, a prism fixing member 32 in the following manner: that is, the vertical angle portion 5 thereof is disposed so as to face forwardly of the case (in FIG. 1, upwardly of the case 3A) and the prism side surfaces 8L, 8R are disposed so as to face the penetration window portions 2L, 2R of the case 3A. By the way, the prism fixing member 32 not only has a function to hold the right and left angle portions of the rear portion (in FIG. 1, the lower portion) of the prism 4 from right and left to thereby fix the prism 4 but also a function to shield the unnecessary light rays that enter the rear areas of the prism side surfaces 8R, 8L (in FIG. 1, the lower areas of the prism side surfaces 8R, 8L) but do not constitute the right-and left-side scenes.

Also, the imaging lens 9 is fixed by a lens holder 26 in such a manner that, in the rear of the prism 4 (in FIG. 1, in the lower portion thereof), the optical axis 25 of the imaging lens 9 is coincident with the bisector of the vertical angle portion 5 of the isosceles-triangular-shaped section of the prism 4. And, the imaging device 10 is fixed in such a manner that, in the rear of the imaging lens 9, the imaging surfaces 10L, 10R are parallel to the prism rear surface 8B and the center 30 of the boundary line between the left and right half surfaces 10L and 10R of the imaging surface is present on the optical axis 25.

In the inside central portion of the front end wall 28 of the case 3A, there is integrally formed a light shield portion (light shielding means) 3a which shields the light that moves crossingly in the right and left direction in front of the prism 4. The light shield portion 3a is formed of light-shielding resin equivalent to that of the case 3A, while the leading end portion of the light shield portion 3a is projected so as to be in contact with the vertical angle portion 5 of the prism 4.

Now, a description will be given below of the operation of the thus structured vehicle periphery visual confirmation apparatus. Firstly, the light ray 18L corresponding to the left-side scene, as shown in FIG. 1, penetrates through the penetration window portion 2L and prism side surface 8L and, after then, it advances through the interior portion of the prism 4 and reaches the prism side surface 8R. And, after it is then reflected by the internal surface of the prism side surface 8R, the light ray 18L is radiated from the prism side surface 8R and is image formed by the imaging lens 9, and it is guided to the left half surface 10L of the imaging surface of the imaging device 10.

In the case of the light ray 18R which corresponds to the right-side scene of the vehicle, as the light rays 18L and 18R are symmetric, the light ray 18R is similarly guided to the right half surface 10L of the imaging surface of the imaging device 10. And, both of the light rays 18L, 18R are converted into image signals by the imaging device 10.

Here, as shown in FIG. 1, let us assume a case in which, for example, at night, a vehicle with a headlight 20 on runs slightly forwardly, that is, approaches our vehicle from the right side. In this case, the light of the headlight 20, penetrates through the right-side penetration window portion 2R and, after then, it is going to cross from right to left in front of the vertical angle portion 5 of the prism 4.

Figure 5:
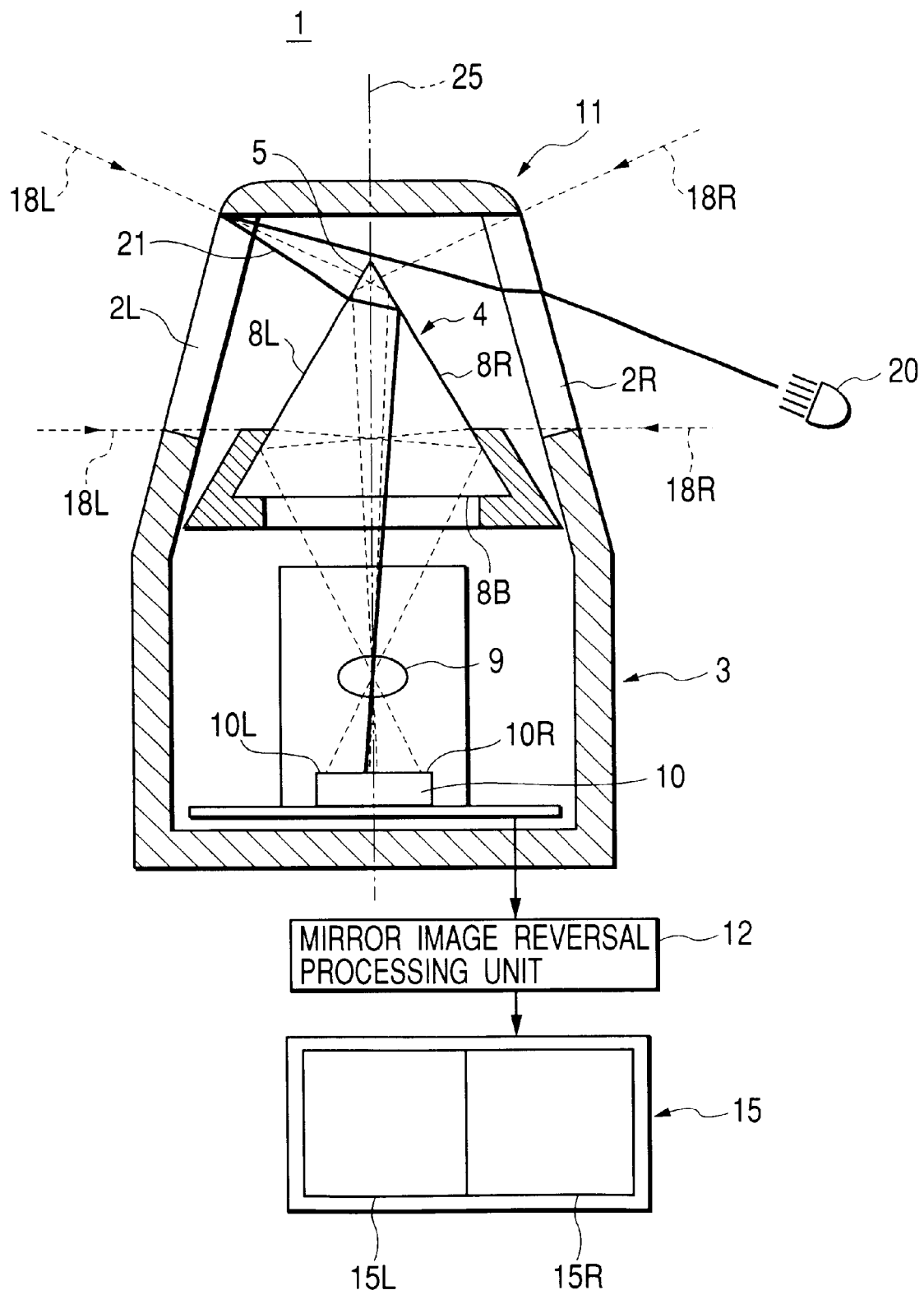
FIG. 5 is a schematic view of the structure of a conventional vehicle periphery visual confirmation apparatus.
Figure 6:
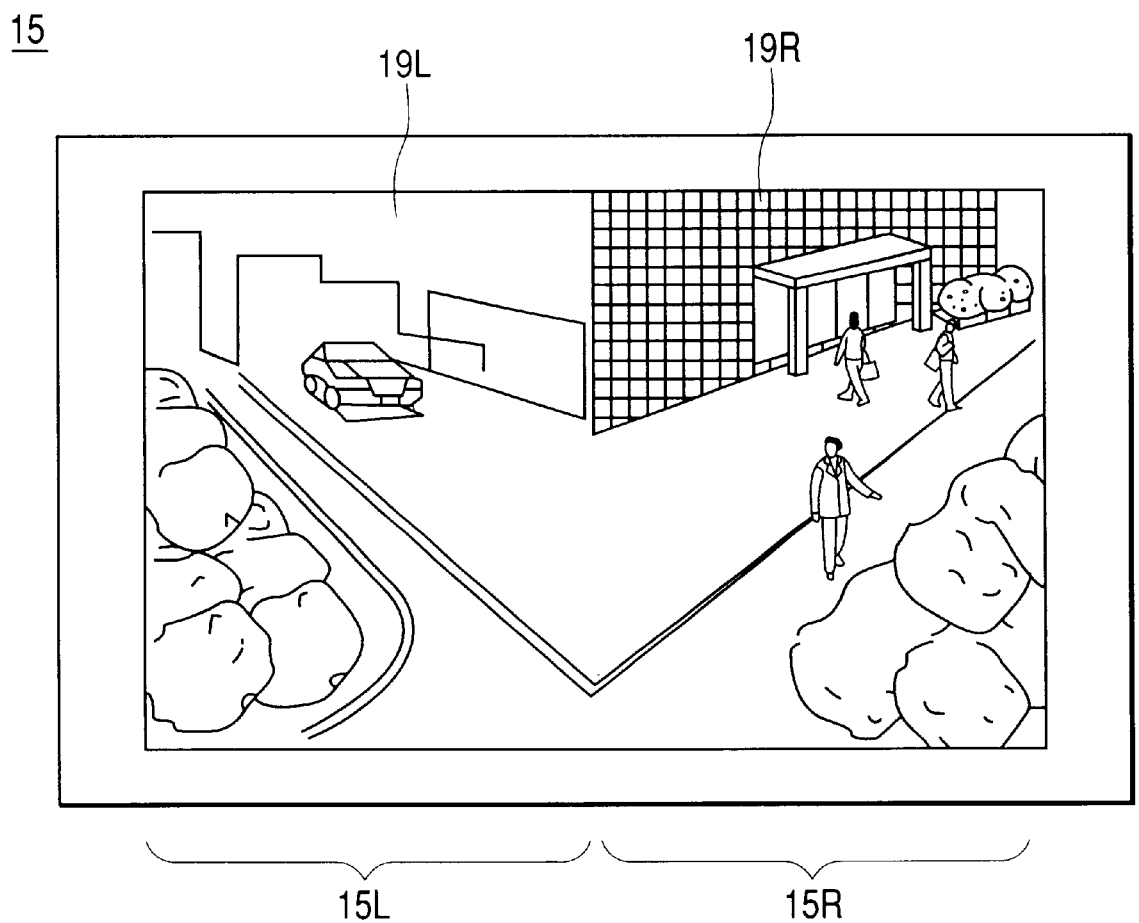
FIG. 6 is an explanatory view of a display state of a display screen in a vehicle periphery visual confirmation apparatus.

However, in the present embodiment, since the light shield portion 3a projectingly formed in the inside central portion of the front end wall 28 of the case 3A is disposed in such a manner it is contacted with the vertical angle portion 5 of the prism 4, the light 22, which is radiated from the headlight 20 and is going to cross in front of the prism 4, can be shielded. Therefore, there can be solved the problem as in the conventional vehicle periphery visual confirmation apparatus shown in FIG. 5: that is, it is possible to prevent part of the light, which has crossed in front of the prism 4, from being reflected by the penetration portion (for example, 2L) and from entering the interior portion of the prism 4; and, therefore, occurrence of the vision image, which raises a problem to be solved in the conventional apparatus, can be prevented.

(Second Embodiment)

Figure 3:
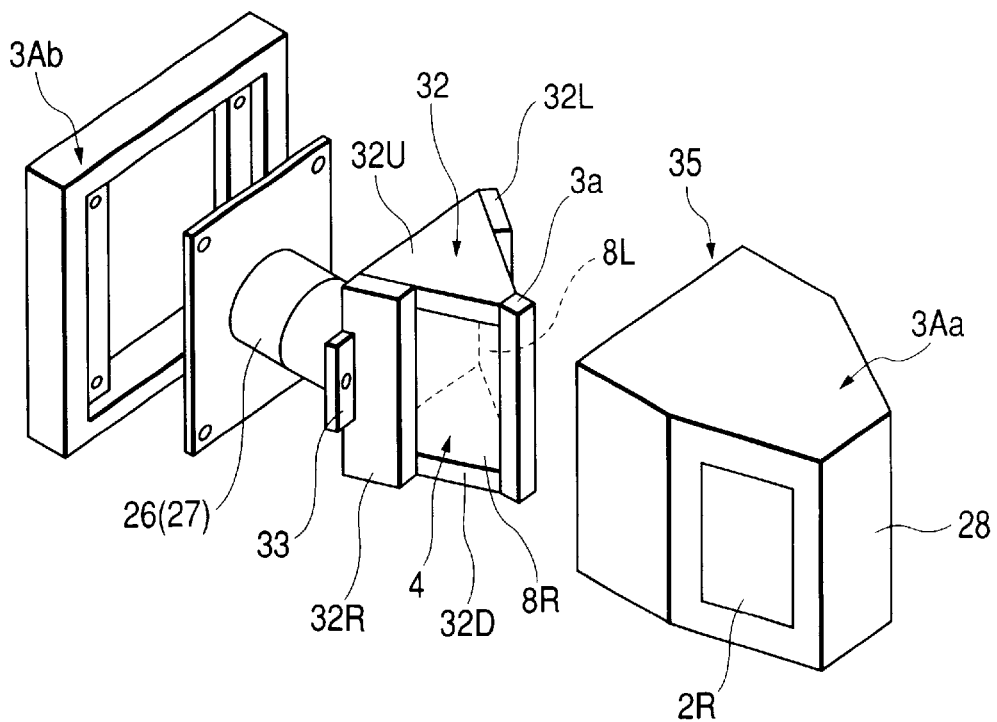
FIG. 3 is an exploded perspective view of a picture camera apparatus forming a vehicle periphery visual confirmation apparatus according to a second embodiment of the invention.

Now, description will be given below of a second embodiment of a vehicle periphery visual confirmation apparatus according to the invention with reference to FIGS. 3 and 4. FIG. 3 is an exploded perspective view of a picture camera apparatus forming the vehicle periphery visual confirmation apparatus according to the second embodiment, and FIG. 4 is a schematic view of the structure of the present vehicle periphery visual confirmation apparatus.

A picture camera apparatus 11B according to the second embodiment is almost similar in structure to the first embodiment, except for the following aspect: that is, in the first embodiment, the light shield portion 3a is formed integral with the case 3A but, according to the second embodiment, as shown in FIG. 3, a light shield portion (light shielding means) 3a is formed integral with a prism fixing member 32 which is used to fix a prism 4 to a case 3Aa (which corresponds to the case 3A). Therefore, in FIGS. 3 and 4, the same parts as those employed in the first embodiment are given the same designations and thus the description thereof is omitted; and, description will be given below of only the parts that are different from those in the first embodiment.

The prism fixing member 32, as shown in FIG. 3, comprises two left and right hold portions 32L, 32R for holding the rear-side left and right angle portions of the prism 4 from the prism side surfaces 8L, 8R, and two upside and downside fixing portions 32U, 32D which are respectively disposed on the upside and downside surfaces of the prism 4 for fixing the hold portions 32L, 32R in such a manner that the hold portions 32L, 32R are disposed so as to be able to hold the prism 4 between them. By the way, on the outer surfaces of the hold portions 32L, 32R, there are formed projecting portions 33 which can be fixed by screws to the inner surface of the case main body 3Aa. In this state, the other areas of the prism side surfaces 8L, 8R than the rear-side areas thereof as well as the prism rear surface 8B are exposed.

Figure 4:
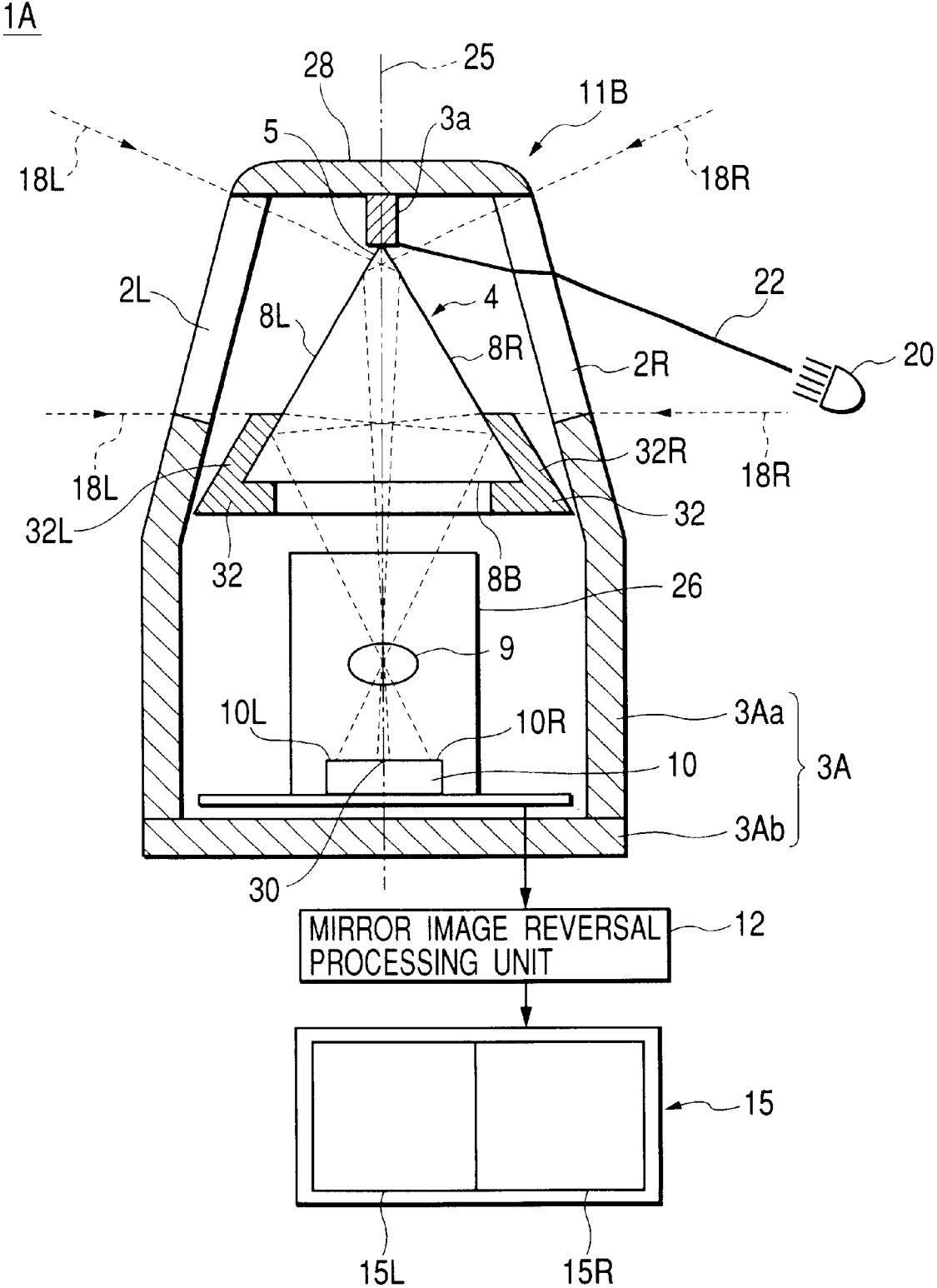
FIG. 4 is a schematic view of the structure of a vehicle periphery visual confirmation apparatus according to the second embodiment of the invention.

The light shield portion 3a, as shown in FIG. 4, is disposed so as to be in contact with the vertical angle portion 5 of the prism side surfaces 8L, 8R and is formed in such a manner that, for example, it is integral with the fixing portions 32U, 32D disposed in the upper and lower surfaces of the prism 4. Also, the light shield portion 3a is also disposed such that, when the case 3Aa is mounted, as shown in FIG. 4, it can be contacted with the inside central portion of the front end wall of the case 3Aa.

The prism 4, in which the prism fixing member 32 and light shield portion 3a are mounted in the above-mentioned manner, can be fixed to the interior portion of the case 3Aa by fixing the projecting portions 33 of the prism fixing member 32 to the inner surface of the case main body 3Aa, for example, using screws. Here, imaging means 27 is composed of an imaging lens 9 and an imaging device 10 respectively disposed within a lens holder 26. And, a rear case 3Ab with the imaging means 27 mounted therein is mounted into the rear-side opening 35 of the case main body 3Aa in such a manner that the imaging means 27 is stored in the case main body 3Aa, thereby forming the picture camera apparatus 11B. Here, in case where the rear case 3Ab is mounted into the rear-side opening 35 of the case main body 3Aa, the case main body 3Aa and rear case 3Ab form the case 3A.

In the above-structured vehicle periphery visual confirmation apparatus 11B as well, there can be provided a similar effect to the vehicle periphery visual confirmation apparatus 1A according to the first embodiment.

By the way, in the above-mentioned respective embodiments, alternatively, the case 3A may also be formed of light transmissive resin and the other portions of the case 3A than the penetration window portions 2L, 2R there of may be painted with light shielding paint. In this case, preferably, the interior portion of the case 3A may be painted with non-light-reflecting black paint (mat paint).

Further, the case 3A may be structured in other various manners: for example, it maybe formed of light shielding material and light transmissive resin (penetration window portions 2L, 2R) in two colors; and, it may be formed of a combination of a metal box body and glass windows.

According to the first to third aspects of the invention, even in case where the light rays coming from the outside enter in front of the vertical angle portion of the prism and is going to cross in front of the prism, the light rays are shielded by the light shielding means. This can prevent the overlapped reflection of a vision image resulting from the fact that the light rays crossing in front of the prism are reflected by the internal surfaces of the penetration window portions and enter the interior portion of the prism.

What is claimed is:

1. A vehicle periphery visual confirmation apparatus comprising a picture camera apparatus disposed on the outside of a vehicle, said picture camera apparatus comprising:
 a case including a pair of right and left penetration window portions respectively formed on the two sides thereof;
 a prism having an isosceles-triangular-shaped section and disposed within said case in such an attitude that its vertical angle portion faces the front portion of said case and its right and left prism side surfaces corresponding to the two equal sides of its isosceles triangle shape respectively face said right and left penetration window portions;

an imaging device disposed in the rear of said prism and, when light rays entering from one of said right and left prism side surfaces are reflected by the other of said right and left prism side surfaces and are radiated from the prism rear surface of said prism, for focusing said light rays onto an imaging surface of said imaging device through a given imaging lens to thereby convert said light rays into image signals; and a light shielding unit interposed and extended between said vertical angle portion of said prism and the front end wall of said case for shielding light rays crossing substantially in the right and left direction in front of said prism.

2. A vehicle periphery visual confirmation apparatus as set forth in claim 1, wherein said light shielding unit is formed integral with said front end wall of said case.

3. A vehicle periphery visual confirmation apparatus as set forth in claim 1, wherein said light shielding unit is integral with a prism fixing member for fixing said prism to said case.

* * * * *